United States Patent [19]
Heller et al.

[11] Patent Number: 5,500,026
[45] Date of Patent: Mar. 19, 1996

[54] METHOD OF ASSEMBLING ELECTROCHEMICAL CELLS OF NOVEL CONSTRUCTION

[76] Inventors: Bernard F. Heller, 143 Crown Rd. Northeast, Fridley, Minn. 55421; Craig L. Schmidt, 4630 Beacon Hill Rd., Eagan, Minn. 55122; Thomas M. Nutzman, 16154 Vintage Dr., Andover, Minn. 55304; Joseph F. Lessar, 3742 114th La. Northwest, Coon Rapids, Minn. 55433

[21] Appl. No.: 460,608

[22] Filed: Jun. 2, 1995

Related U.S. Application Data

[62] Division of Ser. No. 54,778, Apr. 27, 1993.

[51] Int. Cl.[6] .................................................. H01M 10/04
[52] U.S. Cl. .................... 29/623.1; 29/623.2; 429/133; 429/157; 429/164; 429/170; 429/199
[58] Field of Search ................ 29/623.1, 623.2; 429/133, 156, 157, 164, 161, 170, 218, 208, 199

[56] References Cited

U.S. PATENT DOCUMENTS

| | | |
|---|---|---|
| 3,874,929 | 4/1975 | Greatbatch . |
| 4,105,833 | 8/1978 | Greatbatch . |
| 4,132,836 | 1/1979 | Greatbatch . |
| 4,135,519 | 1/1979 | Greatbatch . |
| 4,166,887 | 9/1979 | Mueller . |
| 4,211,832 | 7/1980 | Mueller . |
| 4,217,403 | 8/1980 | O'Boyle . |
| 4,598,466 | 7/1986 | Arenas et al. ................ 29/623.2 |
| 4,952,469 | 8/1990 | Wicelinski . |
| 5,139,898 | 8/1992 | Schneider . |

*Primary Examiner*—Prince Willis, Jr.
*Assistant Examiner*—M. Nuzzolillo
*Attorney, Agent, or Firm*—Daniel W. Latham; Harold R. Patton

[57] ABSTRACT

A lithium halide button cell formed of simplified subassemblies including one such subassembly in which molten cathode material is poured into a retaining ring and allowed to solidify therein before incorporation into the cell.

5 Claims, 4 Drawing Sheets

5,500,026

METHOD OF ASSEMBLING ELECTROCHEMICAL CELLS OF NOVEL CONSTRUCTION

This is a divisional of application Ser. No. 08/054,778 filed on Apr. 27, 1993, now pending.

BACKGROUND OF THE INVENTION

FIELD OF THE INVENTION

This invention relates to the fabrication of electrochemical cells generally. Specifically, it is concerned with a method of fabricating electrochemical cells from sub-assemblies of novel construction and with the novel structure of the resultant electrical chemical cells themselves. In a preferred embodiment, the active anode and cathode materials of such cells are lithium anode materials and halogen cathode materials such as iodine or a polyiodide contained in an organic component material such as polyvinylpyridine or poly-2-vinylpyridine may be included between the anode proper and the cathode proper.

In the past, such cells making use of such halogen cathode materials have been assembled within a container. The molten cathode material was poured through an opening in the cell container after its main structural components had been assembled within the cell container. Thereafter, the fill opening was sealed. For purposes of this invention the term "fluid" is meant to describe any cathode component material capable of flowing during at least some step of cell fabrication. The following listed U.S. patents show various lithium-halogen batteries or electrochemical cells making use of cell containers into which a fluid cathode component is introduced into the container through a filler opening: U.S. Pat. Nos. 4,105,833; 4,135,519; 4,132,836; 4,166,887 and 4,211,832. Other patents of interest are U.S. Pat. Nos. 4,217,403 and 3,874,929.

Other electrochemical cells incorporating different components may make use of this invention. It should be understood for purposes of this invention that the fluid component used needs to be in fluid form only at the time of cell fabrication or assembly. Thereafter it may solidify for cell operation.

SUMMARY OF THE INVENTION

This invention provides an improvement in electrochemical cell fabrication wherein the cathode component is introduced into a subassembly rather than into the assembled electrochemical cell structure through a fill port. As a result, novel assembly methods and novel cell constructions are provided which are simpler and easier to assemble and therefore lead to low cost manufacture.

BRIEF DESCRIPTION OF THE DRAWINGS

A detailed description of the invention is hereafter described with specific reference being made to the drawings in which.

DETAILED DESCRIPTION OF THE INVENTION

Figure 1:
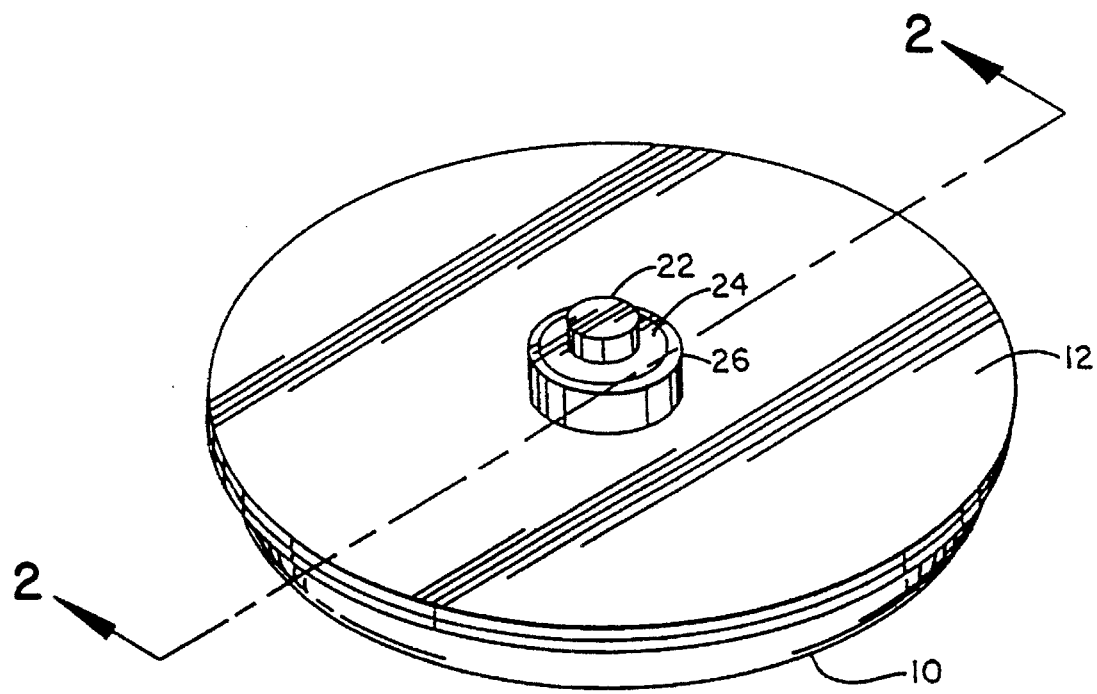
FIG. 1 is a perspective view of an electrochemical cell illustrating the novel construction of the invention.
Figure 2:
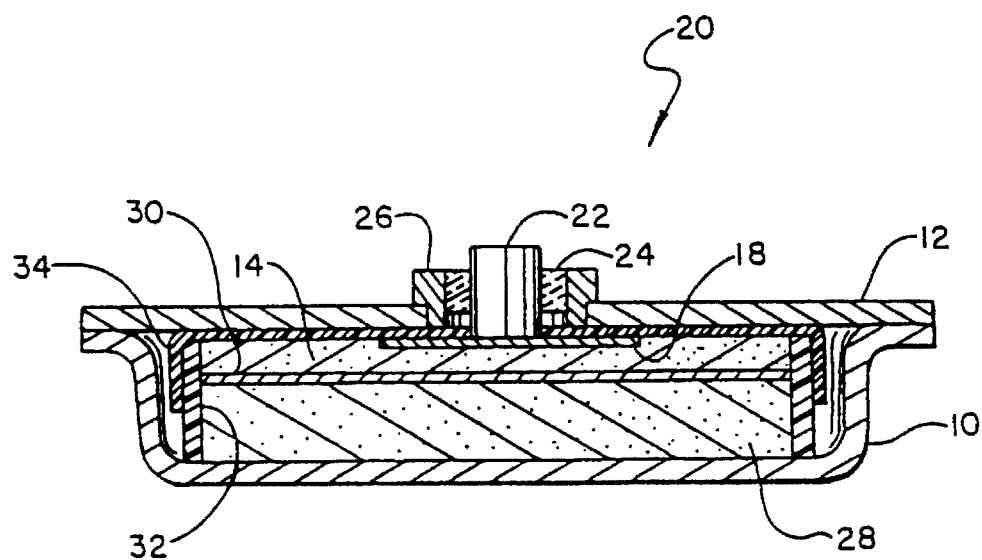
FIG. 2 is a side elevational view in section along line 2—2 of FIG. 1.

Referring now specifically to FIGS. 1 and 2, a sealed lithium-halogen cell is illustrated showing a preferred application of the invention. The cell comprises a bottom enclosure portion 10 which may take the form of a shallow metal can or container of any predetermined configuration such as a round container for preparing a "button" cell of the type illustrated. Container 10 may be stainless steel the open top of which is closed by means of a substantially flat top portion or cover 12, also of stainless steel. Top and bottom portions 10 and 12 respectively, are welded together as a last assembly step to provide a sealed container. The cell further includes anode means comprising a lithium element 14 having an anode current collector element 18. Current collector 18 is a relatively thin metal element, which may be formed with apertures (not shown) for establishing intimate contact with the relatively soft lithium anode. Collector 18 may be formed of a variety of metals such as nickel, zirconium, stainless steel, etc. A conductor lead feedthrough assembly generally indicated at 20 includes a pin 22 of stainless steel or other suitable metal which is butt welded to collector 18 and is of sufficient length to extend out of the feedthrough structure 20 for making an external electrical connection thereto. Pin 22 is sealed from the remainder of the cell by means of the feedthrough structure 20 which includes a glass insulator element 24 and an upstanding metal ferrule element 26. Ferrule 26 may be a separate element welded to top 12 or it may be an integral upset element formed from top 12 by metal stamping or the like. Underneath lithium anode 14 is the halogen cathode material 28. The cell is shown as including with the anode a polymer film 30 such as polyvinylpyridine, poly-2-vinylpyridine or the like. The polymer film is preferred but not necessary. Hence, it may be omitted. The anode, cathode and polymer film are surrounded by a retaining ring 32 comprised of a flat inert plastic band having upper and lower edges as shown in the Figure. Any nonreactive plastic is suitable for retaining ring 32 which is inert to the cell contents and which can serve as a frame retaining member for the active anode and cathode components. Typically, a modified polytetrafluoroethylene such as Tefzel™ a copolymer of ethylene and tetrofluoroethylene manufactured under this trademark by E.I. DuPont De Nemours Company of Wilmington, Del. 19898, is preferred. However, a fluoropolymer such as Halar™ a trademark of Allied Chemical Company or a polyvinylidenefluoride sold under the trademark Kynar™ by Penwalt Corporation of Philadelphia, Pa. 19102, is also acceptable. Other materials will be useable by those familiar with this art.

The anode/polymer film/cathode/retaining ring subassembly is shown in FIG. 2 as being received into an inverted cup-shaped insulator 34, also of non-reactive plastic of any of the aforementioned types or even polypropylene. Another subassembly is provided by the top portion 12, pin 22, insulator cup 34 and anode collector 18. These two subassemblies will be discussed further hereinbelow. For the present it is sufficient to note that the anode subassembly is positioned within the insulator cup subassembly with the anode 14 lithium surface in intimate contact with the anode current collector 18 and the bottom of the insulator cup 34 as shown in FIG. 2.

As already indicated, the halogen cathode material 28 may be any of the various materials known in the art such as iodine or a polyiodide contained in an organic component material such as polyvinylpyridine or poly-2-vinylpyridine or the like. This type of cathode material is well known and incorporated into the cell in the form of a fluid or molten material which is allowed to solidify upon cooling.

Figure 3A:
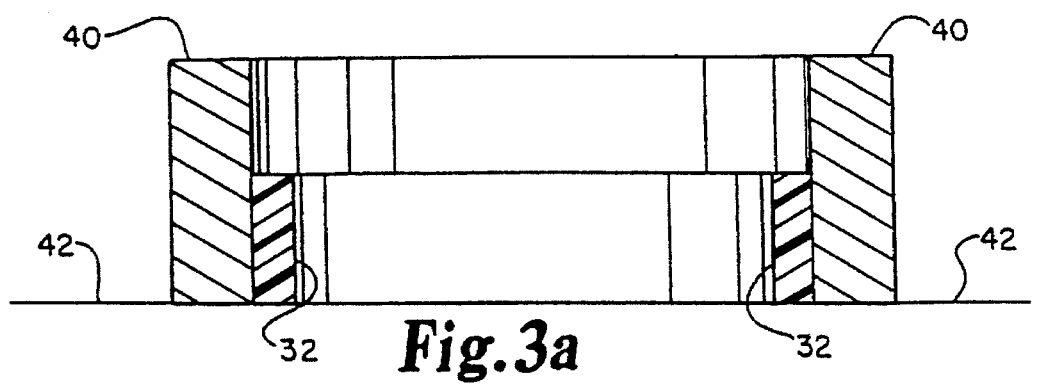
FIG. 3A through FIG. 3E are simplified sectional diagrams of an anode/cathode subassembly during fabrication in a holding die.
Figure 3B:
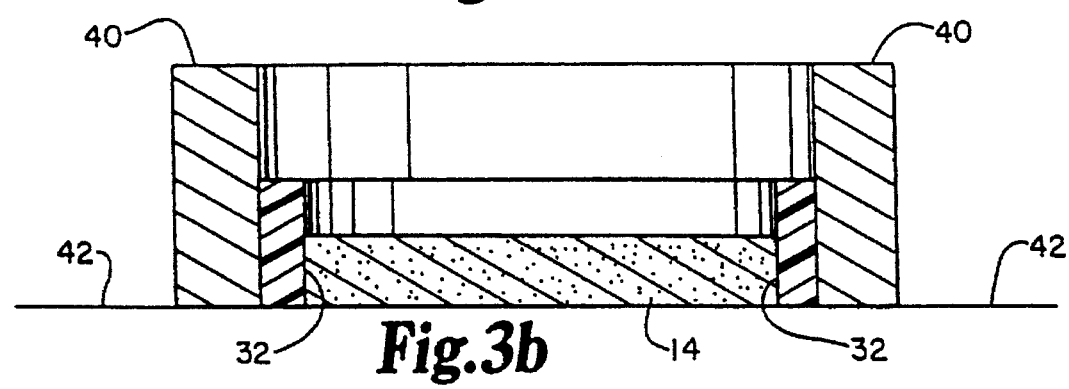
Figure 3C:
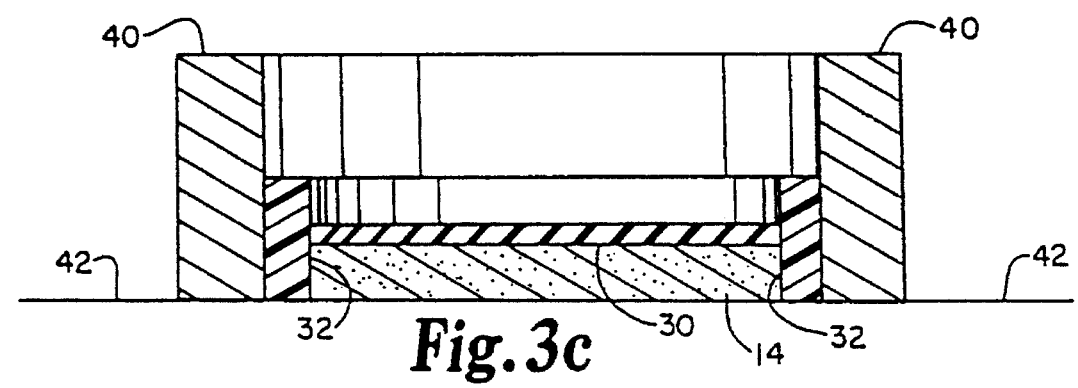
Figure 3D:
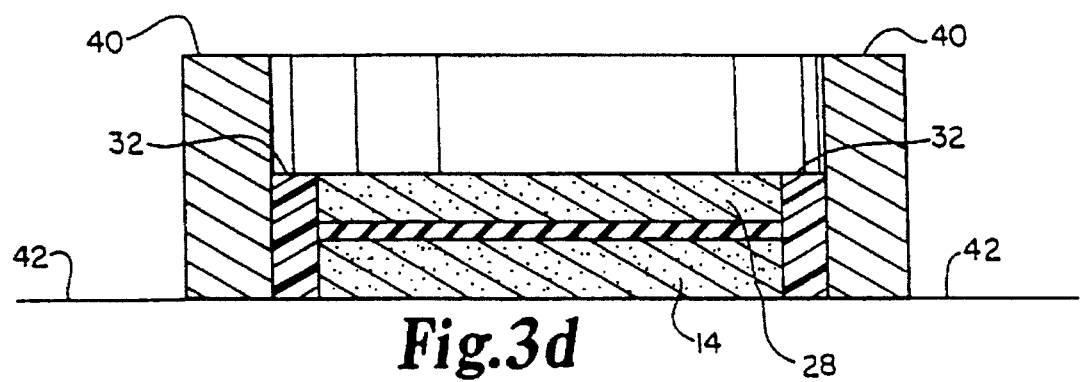
Figure 3E:
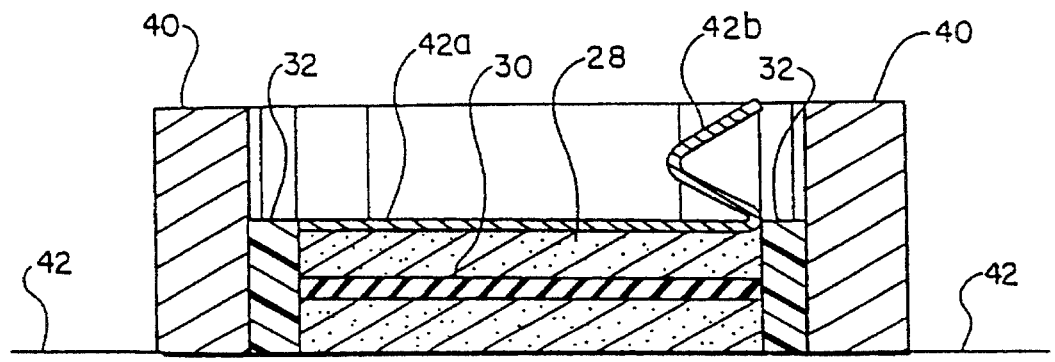
Figure 3F:
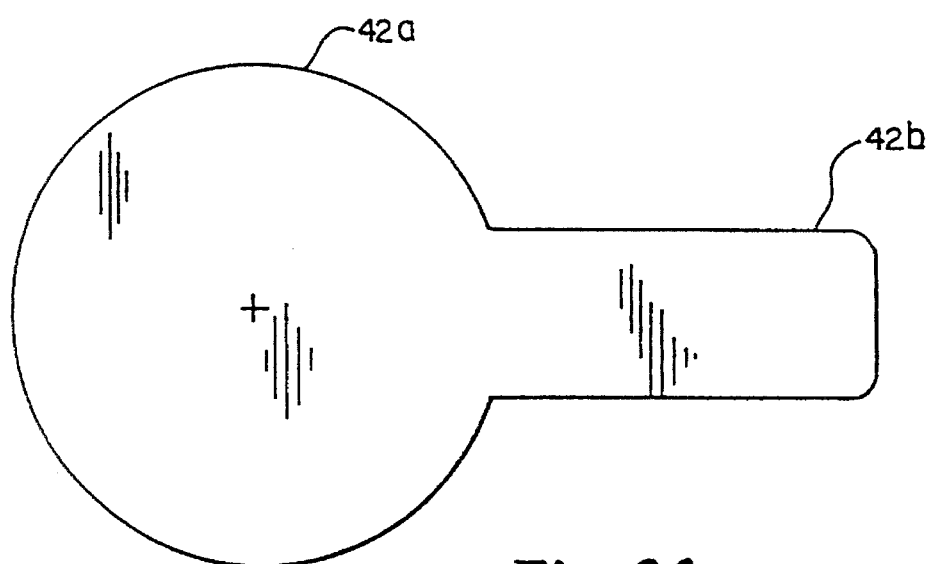
FIG. 3F is a top plan view of a preferred cathode current collector lead structure used in the subassembly of FIGS. 3A through 3E.

Referring now to FIGS. 3A–3F the fabrication procedure as modified by the present invention for fabricating a subassembly of simplified structure and simplified fabrication procedure will now be described. The fabrication of the anode/polymer film/cathode subassembly is begun by providing a fixture or die 40 which will preferably be of a cylindrical shape as shown in FIGS. 3A–3E and may be of any relatively heavy tool metal as is typically used in the art for die purposes. Die 40 may have an open top and bottom end as shown or the bottom may be enclosed as an option. In either event, a parting sheet of suitable plastic 42 is placed at the bottom of the die to receive retaining ring 32 as shown in FIG. 3A. Next, as shown in FIG. 3B, a slightly undersized disc of lithium metal is placed into the retaining ring and may be pressed until the lithium flows to fill the internal diameter of retaining ring 32. A disc of separator film 30 such as poly-2-vinylpyridine is next placed into ring 32 over the top of the lithium anode as shown in FIG. 3C. The film may be pressure bonded to lithium during pressing. Then, the molten cathode material is poured into the ring over the separator film 30 as shown in FIG. 3D. The ring may be filled to its upper edge with the cathode material or a slight space may be left as shown in FIG. 3D to leave room for an optional metal cathode current collector of the type shown in FIG. 3F. Current collector 42 as shown in 3F includes a round body portion 42a and a lead portion 42b and may be positioned over the cathode material 28 as shown in FIG. 3E. Cathode current collector 42 will typically be of stainless steel and will be extremely thin almost of a foil thickness. Intimate contact between the cathode and cell container with or without the collector allows the container to function as the cathode connection for the cell.

Figure 4:
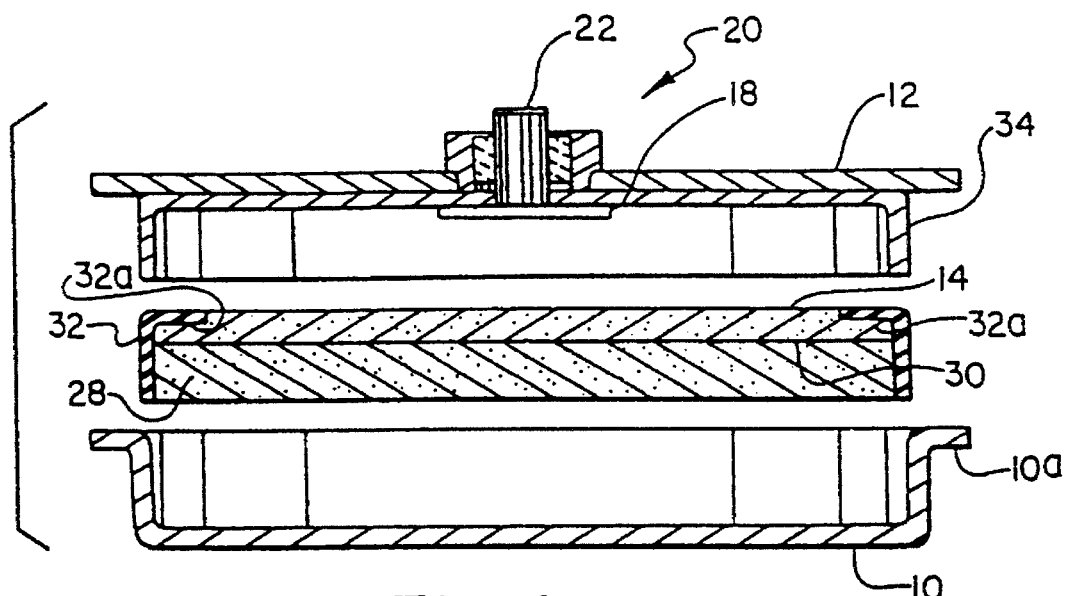
FIG. 4 is a sectional exploded view showing of the various sub-assemblies of a preferred electrochemical cell according to the invention demonstrating how they fit together for final assembly.

Referring now to FIG. 4, the top/insulator cup/anode collector subassembly is best seen and understood in terms of its assembly. Cover 12 fitted with feedthrough 20 is mated with pin 22 which has been butt welded to collector 18 after the inverted insulator cup 34 has been fitted over the pin and collector 18 has been brought into contact with the relatively large surface area of pin 22 for welding. Attachment by slip fit, crimping, etc., may be used in place of welding. At this point, this subassembly is ready to be mated with the anode/cathode/separator subassembly as shown in the FIGURE with the lithium surface positioned for contact with collector 18. Retaining ring 32 is shown in this FIGURE with an optional structural variation including an inwardly directed flange on its upper end at 32a as shown in the FIG. This subassembly is merely received in insulator cup 34 followed by placement of can 10 the flange 10a of which is then welded to cover 12 to seal the cell. The cathode collector 42 may be included if desired but is not shown in this Figure.

It will be readily seen that by providing step-wise assembly by way of subassemblies any necessity to scrap any portion of a subassembly will have minimal cost effects because the entire cell is not involved at any of these subassembly stages. Moreover, such sub-assemblies lend themselves to simplified fabrication procedures such as handling and the like leading to lower cost. The subassemblies may, of course, be put together in reverse order to that described herein.

Figure 5:
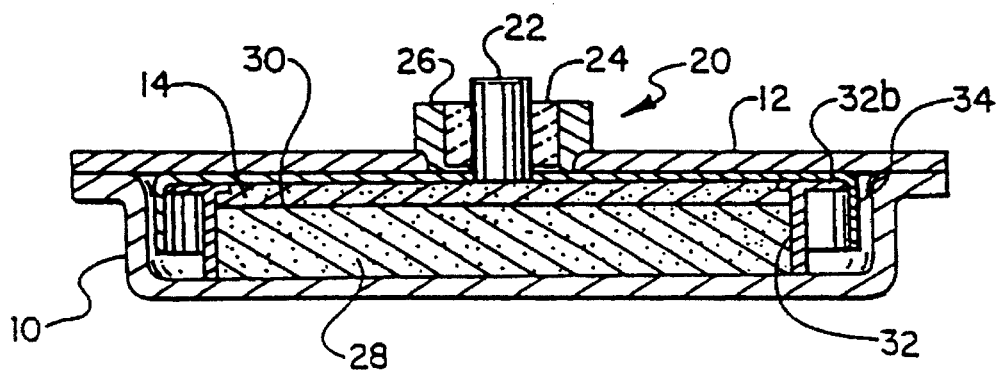
FIG. 5 is a sectional assembly view of an electrochemical cell similar to that of FIG. 2 showing an optional retaining ring construction.

As has already been pointed out in connection with FIG. 4, an optional configuration of retaining ring 32 may include an inwardly extending flange 32a which may be used as desired. Another variation is shown in FIG. 5 which includes an outwardly extending flange 32b. This flange arrangement is most preferred as it can be utilized to position a retaining ring 32 of lesser diameter as may be desired in those cases where adjustment of the cell capacity is needed.

While the preferred embodiments have been described in detail, this has not been done for purposes of limitation but by way of illustration. The invention is intended to be defined by the following claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of assembling a cell having a flattened shape and of a predetermined configuration, the cell being comprised of stacked members, the steps comprising:

providing top and bottom enclosure portions adapted to be fitted together to form a sealed enclosure;

providing a first cell subassembly including said top enclosure portion, an inverted insulator cup, a feedthrough structure in the top portion, a feedthrough pin extending through the top portion and the insulator cup, and an anode collector attached to the interior end of the pin inside the top portion and insulator cup;

providing a second subassembly including anode and cathode members conforming to the configuration of the cell so as to fit within the top and bottom enclosure portions when they are joined together, the second subassembly being assembled as follows:

providing a retaining frame member, a holding die including a parting means, anode material, cathode material, associating the die and frame member so as to allow placement of the anode material within the die and frame member following placement of the frame member within the die;

pouring melted cathode material onto the anode within the frame member and die;

allowing it to solidify and removing the second subassembly from the die;

placing the second subassembly within the insulator cup of the first subassembly with the anode surface oriented to contact the anode collector, and bringing the top and bottom enclosure portions together so as to enclose the subassemblies and welding same said subassemblies together to form a sealed enclosure.

2. The method of claim 1 wherein the order of assembly is reversed, the second subassembly being placed in the bottom enclosure portion and the first subassembly being thereover with the top enclosure portion being fitted thereover to complete assembly.

3. The method of claim 1 wherein the retaining frame member is ring-shaped

4. The method of claim 1 wherein the anode material comprises lithium and a film comprising polyvinylpyridine, and the cathode material comprises iodine and a form of polyvinylpyridine.

5. The method of claim 1 wherein the retaining frame member is ring-shaped having upper and lower edges, one of which includes a flange portion.

\* \* \* \* \*

UNITED STATES PATENT AND TRADEMARK OFFICE
CERTIFICATE OF CORRECTION

PATENT NO. : 5,500,026
DATED : Mar. 19, 1996
INVENTOR(S) : Bernard F. Heller et al.

It is certified that error appears in the above-identified patent and that said Letters Patent is hereby corrected as shown below:

C. 4 L. 50, 51     "welding same said subassemblies" to be changed to "welding said subassemblies"
C. 4 L. 58     "shaped" to be changed to "shaped."

Signed and Sealed this

Fourteenth Day of December, 1999

Attest:

Q. TODD DICKINSON

Attesting Officer      Acting Commissioner of Patents and Trademarks